UNITED STATES PATENT OFFICE.

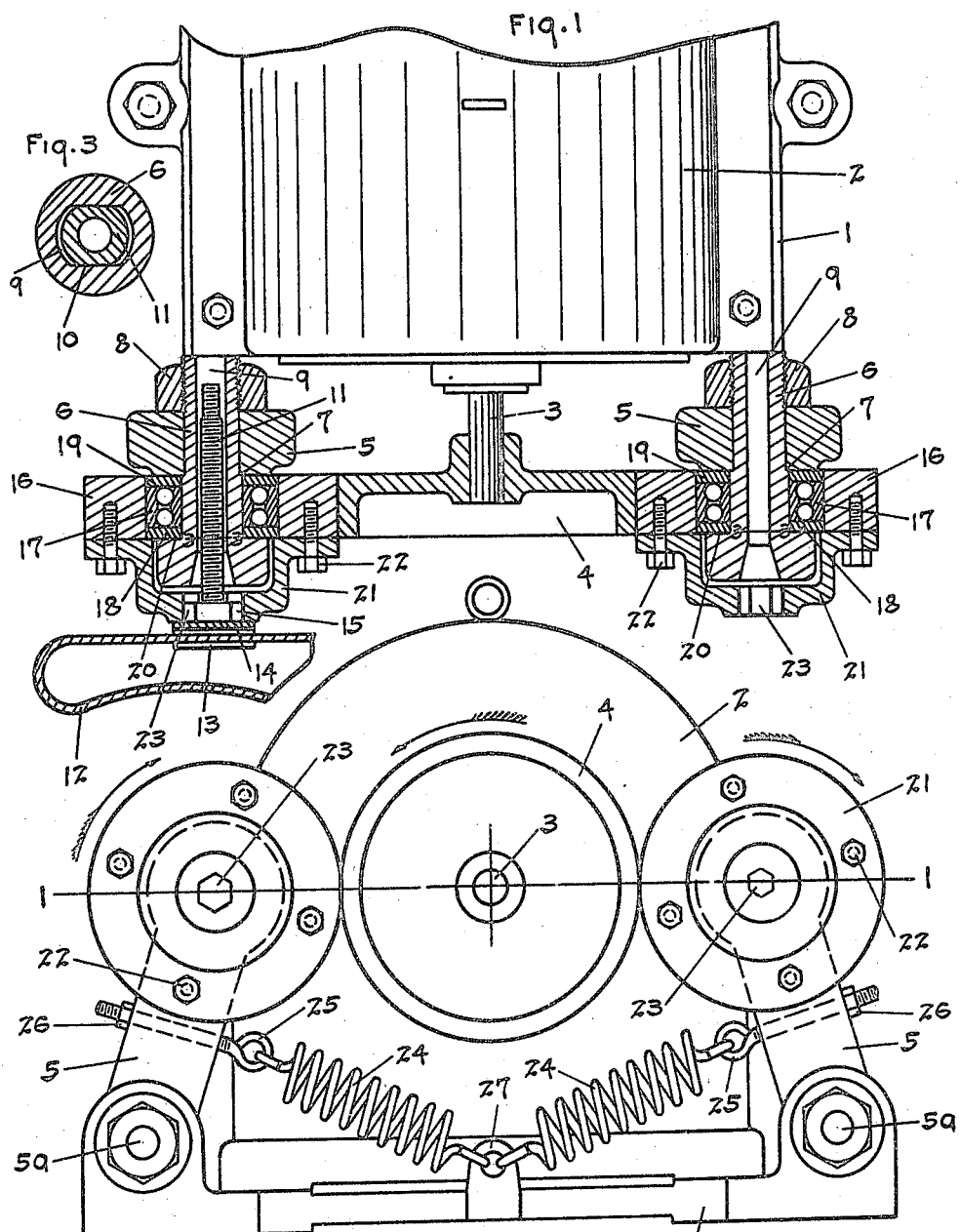

JOSEPH G. MOOMY, OF ERIE, PENNSYLVANIA.

WRENCH MECHANISM.

1,412,667.

Specification of Letters Patent.  Patented Apr. 11, 1922.

Application filed February 11, 1920. Serial No. 357,856.

*To all whom it may concern:*

Be it known that I, JOSEPH G. MOOMY, a citizen of the United States, residing at Erie, in the county of Erie and State of Pennsylvania, have invented new and useful Improvements in Wrench Mechanism, of which the following is a specification.

The device is designed to screw nuts on valve stems of inner tubes in the ordinary manufacture of inner tubes. Such stems are of considerable length and the nut is screwed on to the same clamping the head of the same on the tube, the purpose being to seal the tube where the stem is secured by the clamping action of the nut. It is desirable, therefore, that the nut exert a uniform pressure and that the operator be relieved of the turning action of the wrench as the nut is set so that the operator will hold the work in place to secure a firm setting of the nut. This broadly has been accomplished in a prior invention set forth in an application filed Feb. 28th, 1919.

Different tubes have different sizes of stems and it is desirable to have the wrenches of different sizes immediately available so that the nuts may be driven to place without adjusting the machine. The principal object of this invention is to accomplish this purpose. Other objects are to simplify the mechanism.

The invention is illustrated in the accompanying drawings as follows:—

Fig. 1 is a section of the device on the line 1—1 in Fig. 2.

Fig. 2 a front elevation of the device.

Fig. 3 a section on the line 3—3 in Fig. 1.

1 marks the base of the machine, 2 an electric driving motor, 3 the drive shaft of the motor, and 4 a friction pulley mounted on the drive shaft.

Wrench arms 5 are mounted on the base 1 by means of bolts 5ª. It will be noted that there is one of these arms at each side of the base, the mechanism on each arm being the same. Stem holding sleeves 6 extend through the upper ends of the arm, the sleeves being provided with shoulders 7 which are clamped against the face of the arm by means of a nut 8 on the inner ends of the sleeves. The sleeve 6 has a stem receiving opening 9 with a flat 10 along one side to receive the usual flat of the stem and thus lock the stem against turning. The stem 11 is secured to a tube 12 in the usual manner, the stem having a head 13 on the inside and a clamping plate 14 on the outside and a nut 15 operating on the plate 14 in the usual manner. It is the nut 15 which it is desired to set. A pulley 16 is provided with a ball bearing 17 which is arranged on the sleeve 6. Plates 18 and 19 are pressed into or secured in the sides of the pulley 16 holding the ball bearing in place. The plate 18 engages a shoulder 20 on the sleeve 6 and the plate 19 rests against the face of the arm 5. A wrench plate 21 is secured by screws 22 on the face of the pulley 16 and has a wrench socket 23 shaped to conform with the nut 15. It will be noted that the wrench socket rotates continuously with the pulley 16.

A spring 24 extends from an eye bolt 25 secured by a nut 26 in the arm 5 to an ear 27 arranged on the base. The spring 24 exerts pressure on the arm 5 and moves the pulley 16 into frictional engagement with the pulley 4.

As before stated the mechanism at each side of the pulley is duplicated in all respects except that the socket 9 at one side is smaller than the other and the wrench socket 23 at one side is smaller than the other to afford means for accommodating a smaller stem at one side than the other. By arranging the friction pulleys at opposite sides of the pulley 4 these are both rotated in the proper direction to set the nut, that is, toward the right.

What I claim as new is:—

1. In a wrench mechanism, the combination of a centrally located driving pulley; friction pulleys arranged at different points on the driving pulley; means for moving said friction pulleys into engagement with the driving pulley; means on which the friction pulleys are mounted; stem receiving sleeves, one for each pulley, said sleeves having stem openings of different sizes; and wrench sockets carried by the pulley, said sockets being of different sizes and in alinement with said stem receiving openings.

2. In a wrench mechanism, the combination of a driving pulley; swinging arms; means for exerting pressure on said arms; stem receiving sleeves carried by said arms, said sleeves being of different sizes; friction pulleys carried by the sleeves and engaging the driving pulley the swinging of the arms carrying the friction pulleys into engagement; and wrenches carried by said pulleys and having wrench sockets in alinement with the stem receiving sleeves, the wrench sockets being of different sizes.

3. In a wrench mechanism, the combination of a frame; a drive pulley centrally mounted in the frame; swinging arms at each side of the drive pulley; springs drawing said arms toward the drive pulley; stem receiving sleeves carried by the arms; friction pulleys mounted on said sleeves and engaging said drive pulley; and wrenches carried by the friction pulleys and having wrench sockets in alinement with said sleeves.

In testimony whereof I have hereunto set my hand.

JOSEPH G. MOOMY.